(12) United States Patent
Suzuki (10) Patent No.: US 7,650,093 B2
(45) Date of Patent: *Jan. 19, 2010

(54) IMAGE FORMING DEVICE, CALIBRATION METHOD AND STORAGE MEDIUM STORING PROGRAM

(75) Inventor: Takayoshi Suzuki, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 295 days.

This patent is subject to a terminal disclaimer.

(21) Appl. No.: 10/985,889

(22) Filed: Nov. 12, 2004

(65) Prior Publication Data

US 2005/0237548 A1 Oct. 27, 2005

(30) Foreign Application Priority Data

Apr. 21, 2004 (JP) .............................. 2004-124986

(51) Int. Cl.
G03G 15/01 (2006.01)
(52) U.S. Cl. ............................. 399/39; 399/40; 399/41; 399/49; 399/301
(58) Field of Classification Search ............. 399/39–41, 399/27–28, 30, 301, 49
See application file for complete search history.

(56) References Cited

U.S. PATENT DOCUMENTS

| | | | | |
|---|---|---|---|---|
| 5,369,476 A | * | 11/1994 | Bowers et al. ................. | 399/49 |
| 5,416,613 A | * | 5/1995 | Rolleston et al. ............. | 358/518 |
| 5,604,567 A | * | 2/1997 | Dundas et al. ................. | 399/39 |
| 5,767,980 A | * | 6/1998 | Wang et al. ................... | 358/475 |
| 6,178,007 B1 | | 1/2001 | Harrington | |
| 6,243,542 B1 | * | 6/2001 | Fujimoto et al. .............. | 399/49 |
| 7,206,068 B2 | * | 4/2007 | Suzuki ........................ | 356/244 |
| 2003/0138261 A1 | * | 7/2003 | Tezuka et al. ................. | 399/49 |

FOREIGN PATENT DOCUMENTS

| | | | |
|---|---|---|---|
| JP | A-07-168412 | | 7/1995 |
| JP | A-10-224653 | | 8/1998 |
| JP | A-2001-134023 | | 5/2001 |
| JP | 2001194856 A | * | 7/2001 |
| JP | A-2001-337496 | | 12/2001 |
| JP | A-2002-152529 | | 5/2002 |

OTHER PUBLICATIONS

English translation of Mestha (JP pub 2001-194856), published Jul. 19, 2001.*

* cited by examiner

*Primary Examiner*—David M Gray
*Assistant Examiner*—Geoffrey T Evans
(74) *Attorney, Agent, or Firm*—Oliff & Berridge, PLC (57) ABSTRACT

An image forming device includes an image forming unit that forms an image including at least one of a user-requested image and a test image onto a recording medium, a controller that controls the image forming unit to form a test image including a mixed color on the recording medium, a transporting path that transports the recording medium on which the test image is formed by the image forming unit, an image detecting unit disposed at the transporting path that detects the test image formed on the recording medium, and a calibration unit that performs a color calibration process based upon the test image detected by the image detecting unit.

17 Claims, 10 Drawing Sheets

FIG. 2

RECORDING SHEET 32 (NTH SHEET)

DIRECTION OF SHEET TRANSPORTING →

REQUESTED IMAGE 321

326a  C:M:Y = 1:1:1
326b  C:M = 1:1
326c  C:Y = 1:1
326d  M:Y = 1:1

32 ((N + 1)TH SHEET)

32 ((N + 2)TH SHEET)

REQUESTED IMAGE 321

COLOR CALIBRATION PROCESS
DURING PRINTING

IMAGE FORMING DEVICE, CALIBRATION METHOD AND STORAGE MEDIUM STORING PROGRAM

BACKGROUND OF THE INVENTION

1. Field of the Invention

The present invention relates to an image forming device performing a color calibration, calibration method and storage medium storing a program.

2. Description of the Related Arts

It is known to provide a method wherein color patches are printed at a regular interval during the use of a printer, whereby the color patches are detected by a sensor and a color calibration value is determined based upon the detected color.

SUMMARY OF THE INVENTION

The present invention is accomplished in view of the abovementioned circumstance, and provides an image forming device, calibration method and storage medium storing a program that can implement a satisfactory color calibration.

In order to attain the abovementioned intention, an image forming device according to an embodiment of the present invention has an image forming unit that forms an image, including at least a user-requested image and a test image, onto a recording medium, controller that controls the image forming unit so as to form a test image including a mixed color onto the recording medium, a transporting path that transports the recording medium on which the test image is formed by the image forming unit, an image detecting unit provided at the transporting path that detects the test image formed on the recording medium and a calibration unit that performs a calibration process based upon the test image detected by the image detecting unit.

BRIEF DESCRIPTION OF THE DRAWINGS

Embodiments of the present invention will be described in detail based on the following figures, wherein.

DETAILED DESCRIPTION OF THE INVENTION

An embodiment of the present invention will be explained hereinbelow.

At first, a printer device 10 to which the present invention is applied is explained.

Figure 1:
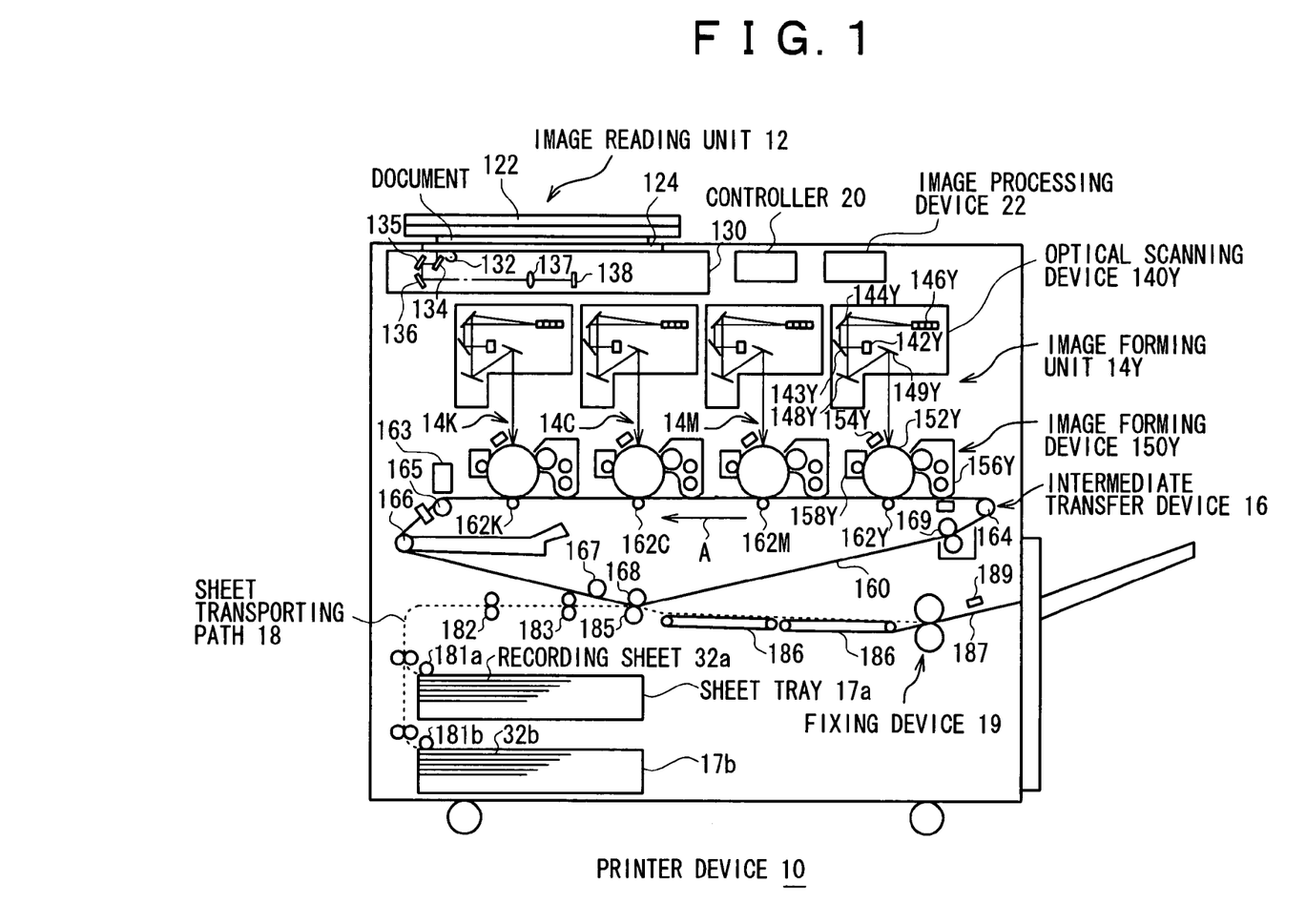
FIG. 1 is a view showing a construction of a tandem-type printer device (image forming device) 10.

FIG. 1 is a view showing a construction of the tandem-type printer device (image forming device) 10.

As shown in FIG. 1, the printer device 10 has an image reading unit 12, an image forming unit 14, an intermediate transfer device 16, plural sheet trays 17, a sheet transporting path 18, a fixing device 19, a controller 20 and an image processing device 22. This printer device 10 may be a multi-functional machine having a function as a full-color copier using the image reading unit 12 and a function as a facsimile in addition to a printer function for printing image data received from a personal computer (not shown). Although the tandem-type printer device 10 provided with plural photoreceptor drums 152 is taken as a specific example in this embodiment, the invention is not limited thereto. Usable printer devices include a rotary-type printer device provided with only a single photoreceptor drum 152, a printer device that forms a toner image of plural colors on a photoreceptor belt or a drum, a printer device that directly transfers onto a recording medium a toner image on the photoreceptor or a printer device that performs a fixing process simultaneously with a transfer process.

Firstly, an outline of the printer device 10 will be explained. Mounted at the upper section of the printer device 10 are the image reading unit 12, controller 20 and the image processing device 22. The image reading unit 12 reads an image on a document and outputs the same to the controller 20. The controller 20 sets an operation mode of each component included in the printer device 10 based upon the image data inputted from the image reading unit 12 or image data inputted from a personal computer (not shown) via a network such as LAN and set information of a user inputted via a user interface (not shown). The operation mode here is an operation type set in advance for each component in the printer device 10. Further, the controller 20 outputs the inputted image data to the image processing device 22. The image processing device 22 performs image processing such as tone correction and resolution correction to the inputted image data, and then, outputs the resultant to the image forming unit 14.

Mounted below the image reading unit 12 are plural image forming units 14 each corresponding to a color composing a color image. In this embodiment, a first image forming unit 14Y, a second image forming unit 14M, a third image forming unit 14C and a fourth image forming unit 14K, each corresponding to each color of yellow (Y), magenta (M), cyan (C) and black (K), are horizontally arranged along the intermediate transfer device 16 with a constant space. The intermediate transfer device 16 rotates an intermediate transfer belt 160 as an intermediate transfer member in a direction shown by an arrow A in the figure. These four image forming units 14Y, 14M, 14C and 14K successively form a toner image of each color based upon the image data inputted from the image processing device 22, and the formed images are transferred (primary transfer) on the intermediate transfer belt 160 at a timing when these plural toner images are superimposed with one another. It should be noted that the order of the color of the respective image forming units 14Y, 14M, 14C and 14K is not limited to the order of yellow (Y), magenta (M), cyan (C) and black (K). The order of the color is optional, for example, the order of black (K), yellow (Y), magenta (M) and cyan (C). It should be noted that the toner image forming unit according to the present invention is, for example, a combination of the image forming unit 14 and the intermediate transfer device 16.

The sheet transporting path 18 is disposed below the intermediate transfer device 16. A recording sheet 32a or 32b fed from a first sheet tray 17a or a second sheet tray 17b is transported on this sheet transporting path 18, on which the toner image of each color that is transferred in a superimposed manner on the intermediate transfer belt 160 is transferred en bloc (secondary transfer). Then, the transferred toner image is fixed by the fixing device 19 and discharged to the outside.

Subsequently, each component of the printer device 10 will be explained in more detail.

As shown in FIG. 1, the image reading unit 12 has a platen glass 124 on which the document is placed, a platen cover 122 that presses the document to the platen glass 124 and an image reading device 130 that reads the image of the document placed on the platen glass 124. The image reading device 130 is constructed so as to irradiate the document placed on the platen glass 124 with a light source 132, to scan a reflected optical image from the document via a reduction optical system composed of a full-rate mirror 134, a first half-rate mirror 135, a second half-rate mirror 136 and a focusing lens 137 to expose the reflected optical image onto an image reading element 138 composed of a CCD or the like, whereby a color reflected optical image from the document is read by the image reading element 138 at a predetermined dot density (e.g., 16 dots/mm).

The controller 20 performs a predetermined image processing to the image data read by the image reading unit 12, such as shading correction, correction of positional displacement of the document, brightness/color space conversion, gamma correction, deletion of frame, or the like. It should be noted that the color reflected optical image of the document read by the image reading unit 12 is document reflectivity data of three colors of red (R), green (G) and blue (B) (each 8 bits) expressed by RGB color system, and it is converted into document color tone data (raster data) of four colors of yellow (Y), magenta (M), cyan (C) and black (K) by the color space conversion process by the controller 20.

The image processing device 22 performs image processing to the image data inputted from the controller 20, such as tone correction, density adjustment, sharpness correction, screen processing, or the like, thereby obtaining binary image data suitable for the printing, and then, outputs the resultant to the image forming unit 14 corresponding to the image data (binary) of each color.

The first image forming unit 14Y, second image forming unit 14M, third image forming unit 14C and fourth image forming unit 14K are horizontally juxtaposed at a constant space. They have almost the same construction except that the color of the formed image is different. Therefore, the following explanation is made about the first image forming unit 14Y. It should be noted that the construction of each image forming unit is distinguished by marking Y, M, C or K.

The image forming unit 14Y has an optical scanning device 140Y that scans a laser beam in accordance with the image data (binary) inputted from the image processing device 22 and an image forming device 150Y that forms an electrostatic latent image by the laser beam scanned by the optical scanning device 140Y.

The optical scanning device 140Y modulates semiconductor laser 142Y in accordance with the image data of yellow (Y) and emits a laser beam LB (Y) from this semiconductor laser 142Y in accordance with the image data. The laser beam LB(Y) emitted from the semiconductor laser 142Y is applied to a rotational polygon mirror 146Y via the first reflection mirror 143Y and second reflection mirror 144Y, is deflected to be scanned by this rotational polygon mirror 146Y, and then, applied onto the photoreceptor drum 152Y of the image forming device 150Y via the second reflection mirror 144Y, third reflection mirror 148Y and fourth reflection mirror 149Y. It should be noted that the optical scanning device 140Y is provided with a light quantity balance correction device that adjusts a quantity of light of a laser beam in accordance with the instruction from the user interface device or the like and an automatic output control device for keeping the output of the laser beam constant, whereby the laser beam LB(Y) emitted from the semiconductor laser 142Y is adjusted to a desired output level.

The image forming device 150Y is composed of the photoreceptor drum 152Y that rotates at a predetermined rotational speed along the direction of arrow A as an image bearing member, a scorotron 154Y for a primary charge that uniformly charges the surface of this photoreceptor drum 152Y as a charging unit, a developing device 156Y that develops the electrostatic latent image formed on the photoreceptor drum 154Y and a cleaning device 158Y. The photoreceptor drum 152Y is uniformly charged with the scorotron 154Y, whereby the electrostatic latent image is formed by the laser beam LB(Y) applied from the optical scanning device 140Y. The electrostatic latent image formed onto the photoreceptor drum 152Y is developed with yellow (Y) toner by the developing device 156Y and transferred onto the intermediate transfer device 16. It should be noted that residual toner or sheet particles adhered to the photoreceptor drum 152Y after the transferring process of the toner image are removed by the cleaning device 158Y. Moreover, a potential sensor (not shown) for measuring the charged amount on the surface of the photoreceptor drum 152Y is provided in the vicinity of the photoreceptor drum 152Y, whereby charge bias voltage applied to the scorotron 154Y is controlled according to the output from this potential sensor.

Like the abovementioned manner, the other image forming units 14M, 14C and 14K form a toner image of each color of magenta (M), cyan (C) and black (K) and transfers the formed toner image of each color onto the intermediate transfer device 16.

The intermediate transfer device 16 has an intermediate transfer belt 160 (image bearing member) looped with a constant tension around a drive roll 164, a first idle roll 165, a steering roll 166, a second idle roll 167, a back-up roll 168 and a third idle roll 169. The drive roll 164 is rotatably driven by a driving motor (not shown), whereby the intermediate transfer belt 160 is circularly driven in the direction of arrow A at a predetermined speed. The intermediate transfer belt 160 is formed into an endless belt by, for example, forming a synthetic resin film such as polyimide having flexibility into a band, both ends of which are joined with adhesion.

Further, the intermediate transfer device 16 has a first primary transfer roll 162Y, a second primary transfer roll 162M, a third primary transfer roll 162C and a fourth primary transfer roll 162K at each position corresponding to each image forming unit 14Y, 14M, 14C and 14K, whereby it transfers the toner image of each color formed on respective photoreceptor drums 152Y, 152M, 152C and 152K in a superimposed manner onto the intermediate transfer belt 160 by these primary transfer rolls 162. Residual toner adhered onto the intermediate transfer belt 160 is removed by a cleaning blade or brush of a cleaning device for the belt disposed at the downstream side of the secondary transfer position.

Further, a density sensor 163 is disposed in the vicinity of the intermediate transfer belt 160. The density sensor 163 optically reads the toner image transferred onto the surface of the intermediate transfer belt 160. The toner image read by the density sensor 163 is used for the detection of non-uniform density and positional displacement of the toner images of each color.

The sheet transporting path 18 has first sheet feed roll 181a and second sheet feed roll 181b for picking up the first recording sheet 32a or second recording sheet 32b from the first sheet tray 17a or second sheet tray 17b, a pair of rolls 182 for transporting the sheet and a resist roll 183 for transporting the recording sheet 32a or 32b to the secondary transfer position at a fixed timing.

Moreover, a secondary transfer roll 185 that is in pressed contact with a back-up roll 168 is disposed at the secondary transfer position on the sheet transporting path 18. The toner image of each color transferred onto the intermediate transfer belt 160 in a superimposed manner is secondary-transferred onto the recording sheet 32a or 32b with press-contact force and electrostatic force by the secondary transfer roll 185. The recording sheet 32a or 32b having the toner image of each color transferred thereon is transported to the fixing device 19 by two transport belts 186.

The fixing device 19 applies a heating process and a pressurizing process to the recording sheet 32a or 32b having the toner images of each color transferred thereon, so that the toner is fused and fixed onto the recording sheet 32a or 32b.

A discharge path 187 that is a part of the sheet transporting path 18 is disposed next to the fixing device 19. The recording sheet 32a or 32b to which the fixing process (heating and pressurizing) is applied passes through the discharge path 187, discharged to the outside of the printer device 10 and stacked onto the exit tray. Further, a calorimetric sensor 189 is mounted to the discharge path 187. The calorimetric sensor 189 reads the image, on the recording sheet 32a or 32b, that is being transported on the discharge path 187, for measuring characteristic amount of this image. The characteristic amount measured by the colorimetric sensor 189 includes, for example, color data (density of each color, saturation, color phase, color distribution or the like).

Subsequently explained is a background of the present invention and an outline of this embodiment.

In the printer device 10, the density or tone reproducibility of the printed image is changed due to an environmental change or the fluctuation of the device characteristic. If plural images are successively printed, in particular, an image quality becomes different among plural images printed in accordance with the same print command due to the environmental change during the printing or the fluctuation of the device characteristic, resulting in noticeable color development fluctuation.

In view of this, it is desirable that a color calibration process is performed at a fixed interval based upon a test image printed by the printer device 10. This color calibration process includes a test image printing process for printing the test image, a difference detecting process for detecting a difference between the basic device characteristic and the current device characteristic and a process for adjusting the device characteristic based upon the result of the difference detecting process.

The printer device 10 in this embodiment particularly prints the test image onto the recording sheet 32 for performing the color calibration process based upon this test image when images are successively printed. Specifically, the printer device 10 in this embodiment allows the color calibration process to interrupt during the printing process required from the user, thereby reducing the color development fluctuation during the successive printing.

It is considered that the calibration process is performed based upon the toner image onto the photoreceptor drum 152 or the intermediate transfer belt 160. However, the toner image formed on the photoreceptor 152 is a single color, so that it is difficult to estimate the color development of the case where toners of plural colors are superimposed, (i.e., the color development of the mixed color), based upon this toner image. Further, when the toner image is fused and fixed onto the recording sheet 32, the color development occurs due to the mutual relation of the characteristic on the surface of the recording sheet 32, the order of the superimposition of the toner images of plural colors and properties of these toners, so that it is difficult to perform the satisfactory color calibration based upon the toner image formed on the intermediate transfer belt 160. Therefore, the printer device 10 of this embodiment desirably performs the color calibration process based upon the toner image formed on the recording sheet 32. More preferably, the printer device 10 performs the color calibration process based upon the toner image that is subject to the fixing process. In the printer device 10 in this embodiment, the test image is read from the recording sheet 32 now being transported by the calorimetric sensor 189 mounted at the discharge path 187, whereby the color calibration process is performed based upon the read test image.

Figure 2:
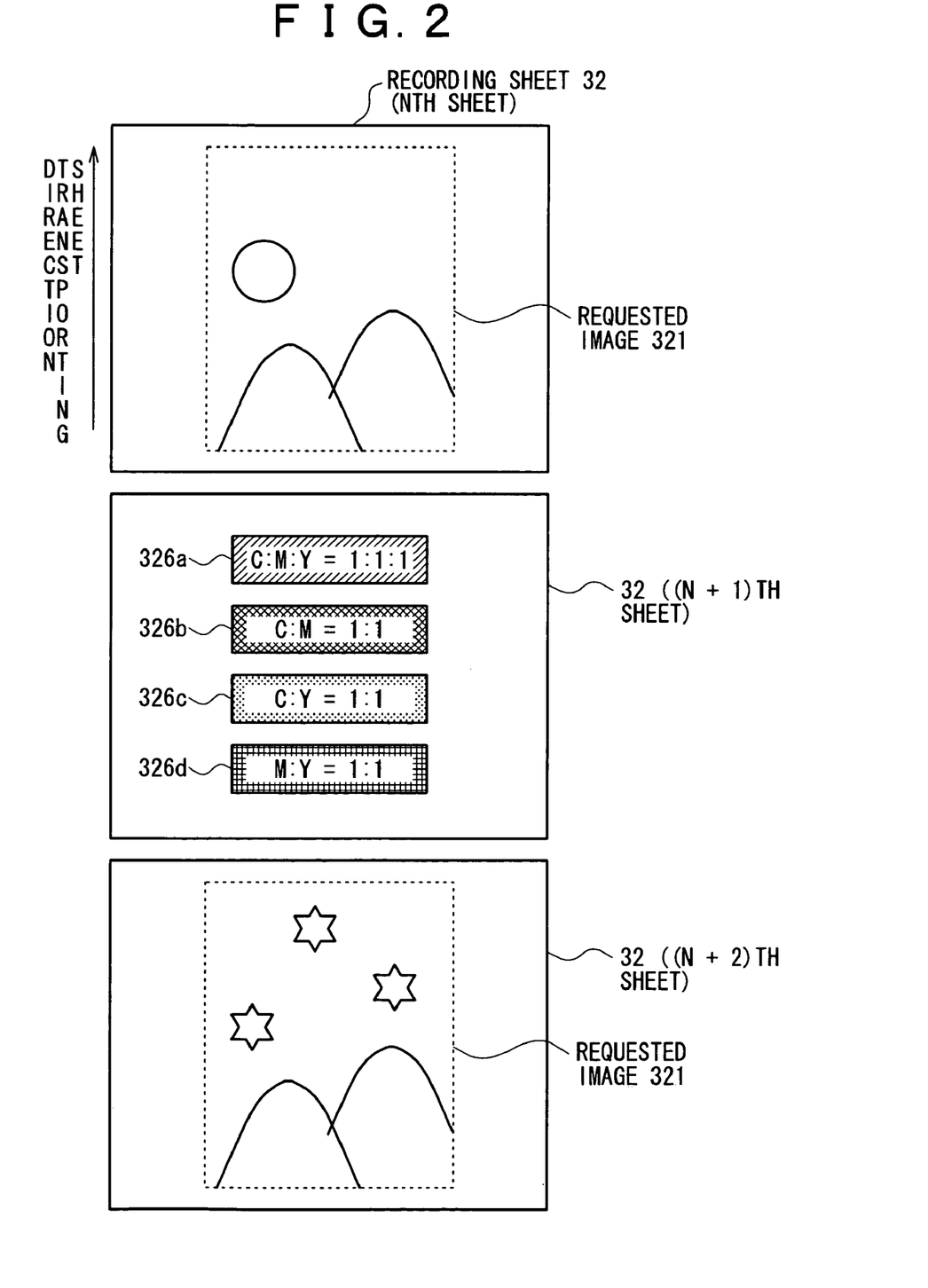
FIG. 2 is a view illustrating a test image printed by the printer device 10.

FIG. 2 is a view illustrating the test image printed by the printer device 10.

If plural images (hereinafter referred to as a requested image) requested to be printed by a user are successively printed, the printer device 10 in this embodiment allows the printing process of the test image to interrupt among the successive printing processes, so that the requested image and a color calibration pattern 326 (i.e., test image) are printed onto a different recording sheet 32 respectively, as illustrated in FIG. 2. The test image printed on the recording sheet 32 includes plural calibration patterns 326a to 326d. These calibration patterns 326a to 326d are printed in a range that can be read by the colorimetric sensor 189 (FIG. 1) (for example, in the vicinity of the center of the recording sheet 32). In this figure, the first calibration pattern 326a is an image of mixed color (tertiary color) of toners of three colors. Specifically, toners of three colors are mixed so as to provide the image having an almost achromatic color. Further, each of the second calibration pattern 326b, third calibration pattern 326c and fourth calibration pattern 326d is an image of mixed color (secondary color) of toners of two colors.

It is desirable that the mixed color included in the calibration pattern 326 is selected from the mixed color of almost achromatic color having high visibility in the color development fluctuation and including all color materials or selected according to a color used in the following printing process (in this embodiment, the printing process after (N+2)th sheet). For example, the printer device 10 in this embodiment selects, from mixed colors used for the following printing processes, a color of almost achromatic and having high frequency of occurrence, wherein only the calibration pattern 326 of the selected color is printed on the recording sheet 32 as the test image. This enables the printer device 10 to restrain the number of the calibration patterns 326 printed on the recording sheet 32, thereby being capable of preventing the productivity from being reduced. Moreover, the printer device 10 prints the selected calibration pattern 326 as great as possible in the limited printing area on the recording sheet 32, thereby being capable of enhancing the reading precision of the calibration pattern 326 by the colorimetric sensor 189.

Figure 3:
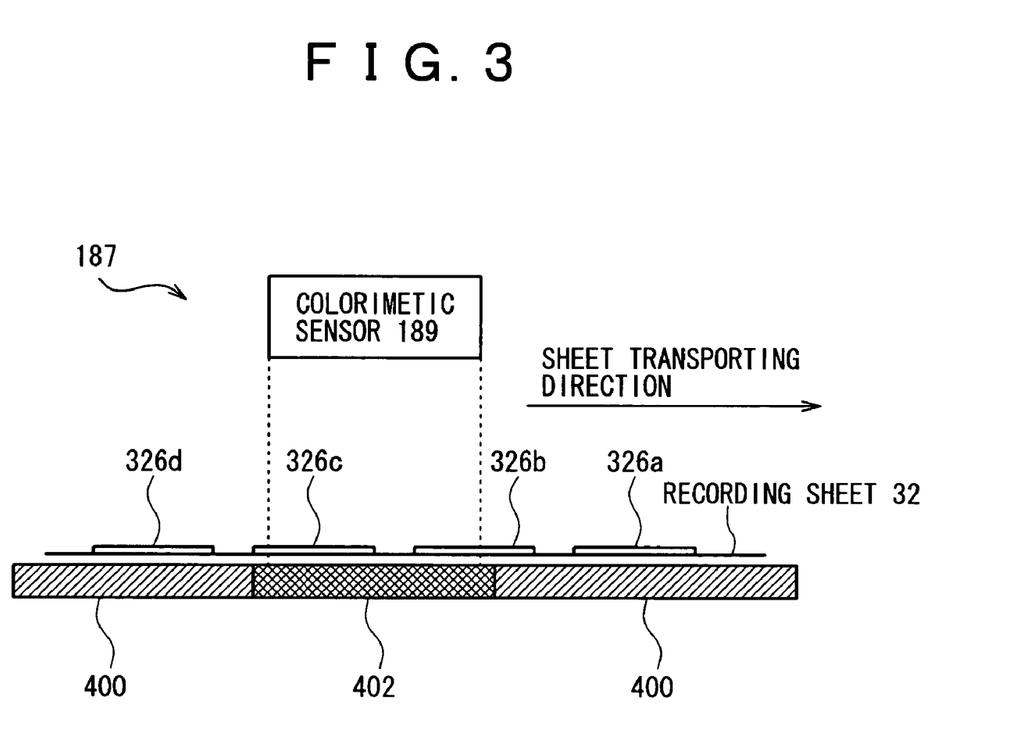
FIG. 3 is a view schematically explaining a discharge path 187.

FIG. 3 is a view schematically explaining a construction of the discharge path 187.

As shown in FIG. 3, one face (bottom face) composing the discharge path 187 is composed of a guide member 400 that guides the recording sheet 32. Further, since the toner image is transferred onto the upper face of the recording sheet 32 at the secondary transfer position (FIG. 1) in this embodiment, the calorimetric sensor 189 is mounted to the other face (top face) composing the discharge path 187, whereby it reads the test image from the recording sheet 32 passing below the colorimetric sensor 189.

Further, the section of the guide member 400 facing the calorimetric sensor 189 is composed of a guide plate 402 that is almost achromatic (black or gray). Specifically, the recording sheet 32 is guided by the guide member that is almost achromatic at the area read by the calorimetric sensor 189. Consequently, if the color of the surface of the guide member 400 is transmitted through the recording sheet 32, the printer device 10 prevents the color balance of the measured result from being shifted due to the influence of the surface color of the guide member 400.

Figure 4:
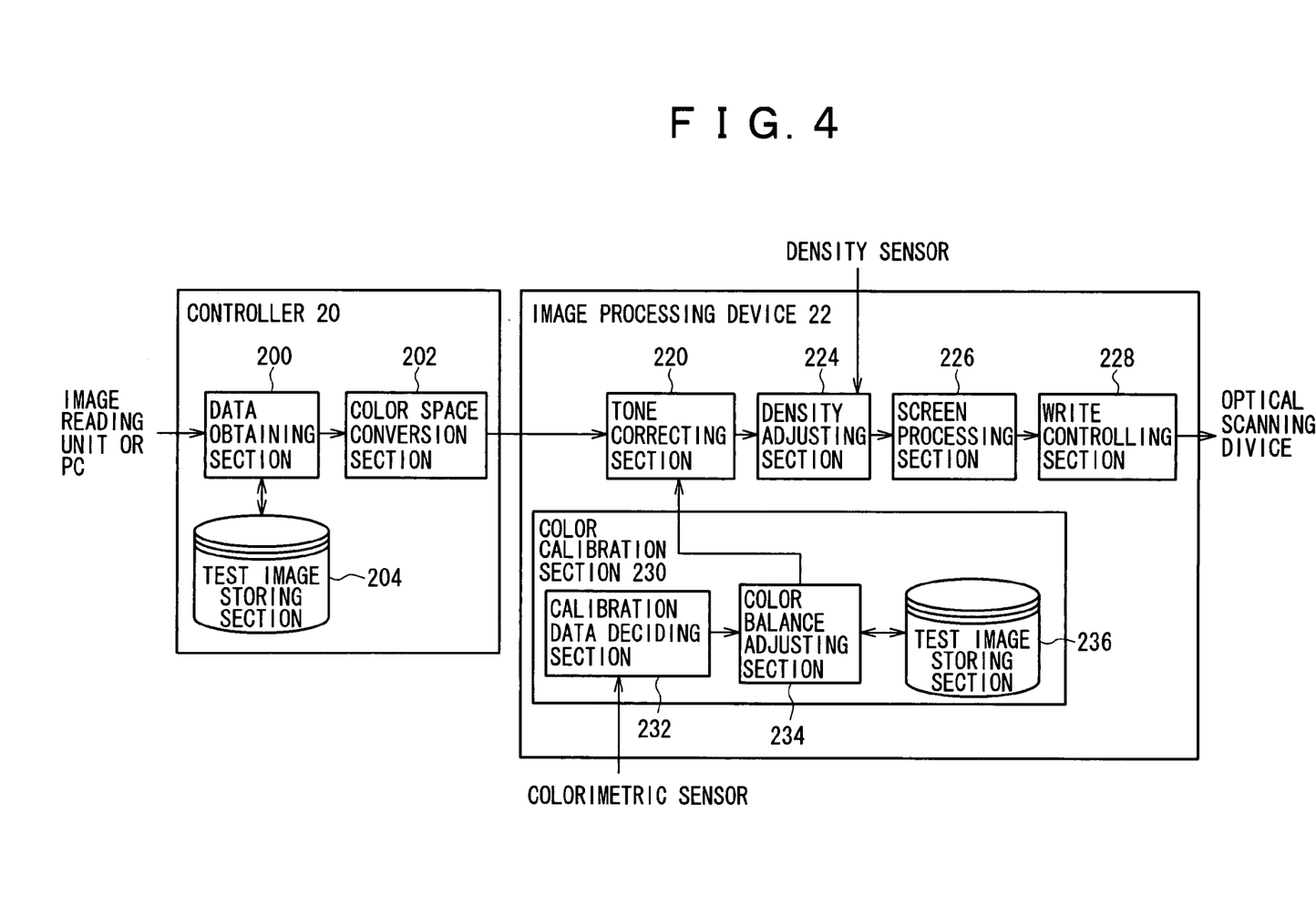
FIG. 4 is a view illustrating a functional construction of a controller 20 and an image processing device 22.

FIG. 4 is a view illustrating the functional construction of the controller 20 and the image processing device 22.

As illustrated in FIG. 4, the controller 20 has a data obtaining section 200, a color space conversion section 202 (color conversion unit) and a test image storing section 204. Further, the image processing device 22 has a tone correcting section 220, a density adjusting section 224, a screen processing section 226, a write controlling section 228 and a color calibration section 230 (calibration unit), wherein the color calibration section 230 includes a calibration value deciding section 232 (calibration data generating unit), a color balance adjusting section 234 and a calibration data storing section 236 (calibration data storing unit).

It should be noted that each of the abovementioned components included in the controller 20 and the image processing device 22 may be implemented by software such as a CPU, a memory and a program or by hardware such as an ASIC.

In the controller 20, the data obtaining section 200 obtains print command data including image data from the image reading unit 12 (FIG. 1) or a personal computer of the user and generates at least one job based upon the obtained image data. The job means a process unit in the image processing device 22, image forming unit 14, intermediate transfer device 16, sheet tray 17, sheet transporting path 18 and fixing device 19, including, for example, a normal job wherein only the requested image is printed and a calibration job wherein the test image is printed. These jobs include information for specifying the image data that should be printed and the operation mode (hereinafter referred to as mode specifying information). This mode specifying information includes information of the number to be printed, a type of the recording sheet used for the printing, color/monochrome, a type of the screen and output resolution. When generating a job, the data obtaining section 200 outputs the generated job to the color space conversion section 202.

The color space conversion section 202 converts the image data (RGB) included in the job into image data (YMCK) of a color system suitable for the printing process and outputs the resultant to the image processing device 22. Specifically, the color space conversion section 202 memorizes in advance a color conversion table for performing the color conversion. It refers to the color conversion table to convert a pixel value of each pixel.

The test image storing section 204 memorizes in advance image data of plural calibration patterns 326 (FIG. 2). It outputs the image data of the calibration pattern 326 to the data obtaining section 200 in accordance with the request from the data obtaining section 200. The calibration patterns 326 memorized in the test image storing section 204 include at least a mixed color (secondary color or tertiary color) that is desirably almost achromatic. The mixed color is obtained by mixing plural colors so as to be visually recognized as one color. For example, dots of plural colors are interspersed in the vicinity area to form a mixed color that is recognized as one color by a person's sight.

The image data of the calibration pattern 326 inputted to the data obtaining section 200 is attached to the calibration job, and then, inputted to the image processing device 22 via the color space conversion section 202.

It should be noted that, if a job is inserted to the image processing device 22, the controller 20 decides an operation mode according to this job (mode specifying information) and operates the image forming unit 14 (FIG. 1), intermediate transfer device 16, sheet tray 17, sheet transporting path 18 and fixing device 19 with the decided operation mode.

In the image processing device 22, the tone correcting section 220 corrects the inputted image data (the image data included in the job) to the tone suitable for the printing process and outputs the resultant to the density adjusting section 224. Specifically, the tone correcting section 220 memorizes in advance a tone correction table for correcting the tone and converts a pixel value of each pixel by referring to this tone correction table.

The density adjusting section 224 detects non-uniform density based upon the density of the toner image inputted from the density sensor 163 (FIG. 1), converts a pixel value of each pixel so as to eliminate the detected non-uniform density and outputs the resultant to the screen processing section 226.

The screen processing section 226 performs a screen process to the image data (multi-value data) inputted from the density adjusting section 224 to convert it into binary image data, and then, outputs the converted data to the write controlling section 228. Specifically, the screen processing section 226 memorizes in advance plural screens having different mesh shapes, cycles or angles. It adopts a screen according to the inputted image data to convert the multi-value image data into binary image data.

The write controlling section 228 generates a pulse signal in accordance with the inputted image data (binary) from the screen processing section 226 and outputs this pulse signal to the optical scanning device 140.

The color calibration section 230 adjusts the color development property of the image printed by the printer device 10 based upon the characteristic amount of the test image inputted from the calorimetric sensor 189. Specifically, the color calibration section 230 includes the calibration value deciding section 232, color balance adjusting section 234 and calibration data storing section 236. The calibration value deciding section 232 controls the calorimetric sensor 189 (FIG. 1) to measure the characteristic amount of the calibration pattern 326 (FIG. 2) printed on the recording sheet 32. The measured characteristic amount is, for example, a density of a color corresponding to the respective calibration patterns.

The calibration value deciding section 232 compares the measured characteristic amount with a reference value (fixed value corresponding to the type of the test image) that is a target value of the color calibration process, to thereby generate calibration data that specifies the color calibration amount according to the difference value between this characteristic amount and the reference value, whereupon it outputs this calibration data to the color balance adjusting section 234.

The color balance adjusting section 234 renews the tone correction table memorized in the tone correcting section 220 based upon the calibration data inputted from the calibration value deciding section 232 in order to adjust the color balance. Specifically, the color balance adjusting section 234 temporarily stores the calibration data inputted from the calibration value deciding section 232 to the calibration data storing section 236 and reads the calibration data from the data storing section 236 at a fixed timing, thereby changing a correction coefficient of the tone correction table memorized in the tone correcting section 220 according to the read calibration data. The tone correcting section 220 performs tone correction by referring to the tone correction table renewed by the color balance adjusting section 234, thereby being capable of outputting the image data having the color balance adjusted.

The color balance adjusting section 234 may adjust the color balance of the output image by changing the coefficient of the color conversion table referred to by the color space conversion section 202, the coefficient of the screen (for example, dither matrix) applied by the screen processing section 226 or quantity of light emitted from the optical scanning device 140, based upon the calibration data inputted from the calibration value deciding section 232.

Figure 5:
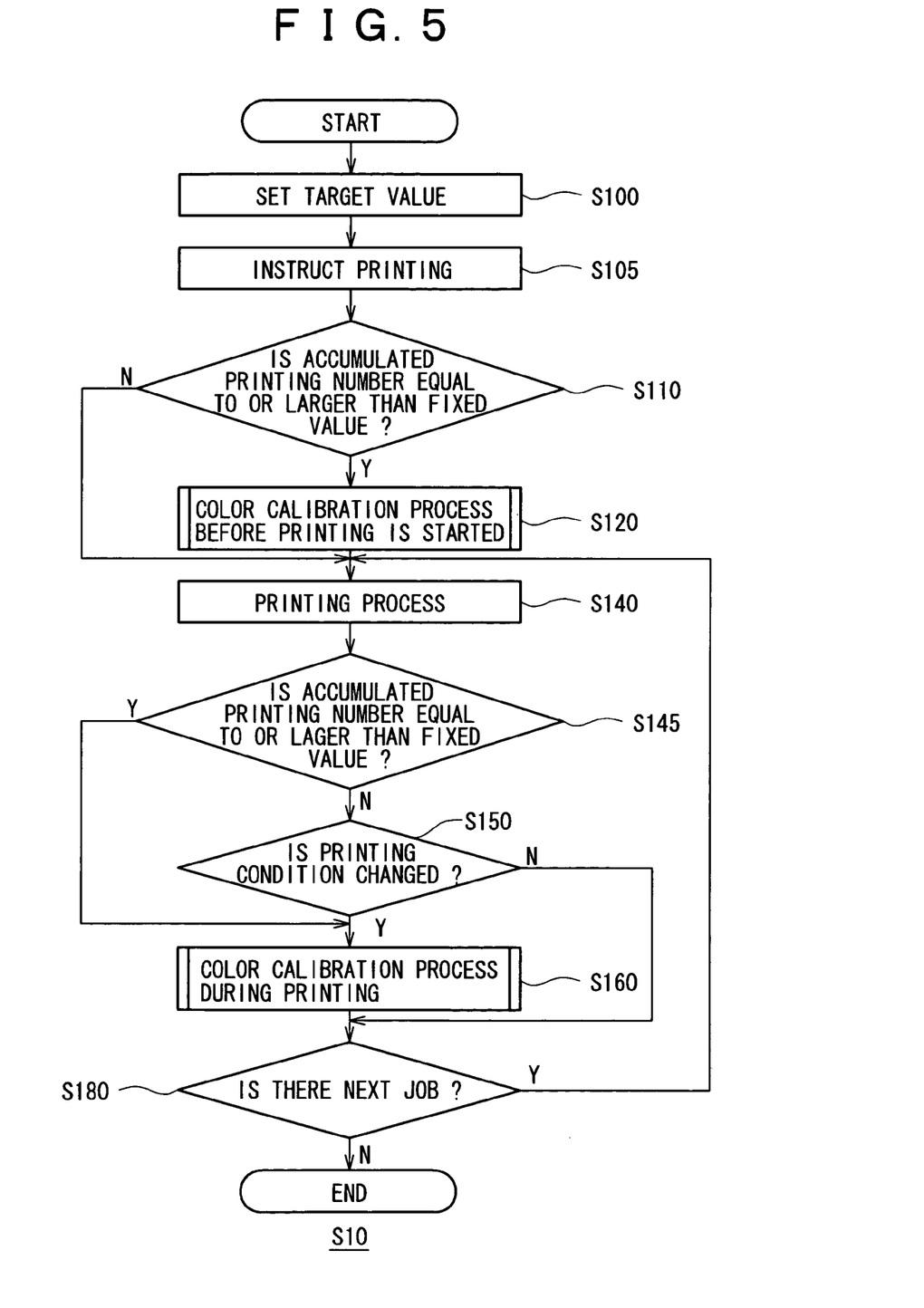
FIG. 5 is a flowchart for explaining the operation (S10) of the printer device 10.

FIG. 5 is a flowchart for explaining the operation (S10) of the printer device 10.

As shown in FIG. 5, the calibration value deciding section 232 (FIG. 4) sets the reference value that is a target value for the color calibration process at a step 100 (S100). The set reference value is, for example, a characteristic amount of the test image if the color calibration process is manually performed.

At a step 105 (S105), a user gives a print command via a personal computer or a user interface device of the printer device 10. When the print command data (including information for designating a number to be printed, a type of the recording sheet, duplex printing/one-sided printing and color/monochrome) is inputted, the data obtaining section 200 obtains image data of the requested image according to this print command data via a network or the image reading unit 12 and memorizes the obtained image data and the print command data so as to establish one-to-one correspondence.

The controller 20 determines whether the accumulated printing number is equal or larger than a fixed value or not at a step 110 (S110). If the accumulated printing number is equal or larger than the fixed value, the program moves to a process at S120. If the accumulated printing number is smaller than the fixed value, the program moves to a process at S140. Specifically, if the accumulated printing number reaches the fixed value, the printer device 10 performs the color calibration process before the printing to eliminate the fluctuation in the color development property.

Before executing the printing process requested by the user, the printer device 10 prints the test image and performs the color calibration process based upon the printed test image at the step 120 (S120).

At the step 140 (S140), the data obtaining section 200 divides the image data that should be printed, based upon the printing number to generate plural jobs (normal jobs), and then, outputs the generated normal jobs to the color space conversion section 202.

The color space conversion section 202 converts the image data (RGB) included in the normal jobs into the image data (YMCK) for the printing and outputs the resultant to the tone correcting section 220. The tone correcting section 220 refers to the tone correction table to perform the tone correcting process to the inputted image data and outputs the resultant to the density adjusting section 224. The density adjusting section 224 performs a density adjusting process for the inputted image data so as to correct the density change of the toner image of a single color based upon the toner image density inputted from the density sensor 163 (FIG. 1) and outputs the resultant to the screen processing section 226. The screen processing section 226 performs a screen process to the image data (multi-value data) inputted from the density adjusting section 224 to binarize it, and then, outputs the binarized data to the write controlling section 228. The write controlling section 228 generates a pulse signal according to the inputted image data (binary data). Further, it outputs to the optical scanning device 140 (FIG. 1) a correction signal for eliminating the non-uniform density in the fast-scanning direction and slow-scanning direction based upon the correction signal visually measured or measured by the density sensor to be set to the image processing device 22. The optical scanning device 140 turns on or off the laser beam according to the pulse signal inputted from the write controlling section 228, to thereby write an electrostatic latent image (requested image) onto the surface of the photoreceptor drum 152. The electrostatic latent image written onto the photoreceptor drum 152 is developed by a toner of each color by the developing device 156. The developed toner image of each color is transferred onto the intermediate transfer device 16 in a superimposed manner. The toner image transferred in a superimposed manner by the intermediate transfer device 16 is transferred onto the recording sheet 32 fed from the sheet tray 17 at the secondary transfer position. The recording sheet 32 having the toner image (requested image) transferred thereon is transported to the fixing device 19 to be subject to the fixing process, and then, transported to the outside of the device through the discharge path 187.

At a step 145 (S145), the controller 20 counts up the accumulated printing number every time the requested image is printed and determines whether or not the accumulated printing number is equal to or larger than the fixed value. If the accumulated printing number is not less than the fixed value, the controller 20 moves to a process at S160. If the accumulated printing number is smaller than the fixed value, the controller 20 moves to a process at S150. Specifically, the printer device 10 forcibly inserts the calibration job to allow the color calibration process to interrupt, if the accumulated printing number reaches the fixed value.

At the step 150 (S150), the controller 20 determines whether or not the printing condition in the successive printing process (for example, the type of the recording sheet 32 used for the printing or the type of the screen applied by the screen processing section 226) is changed. If the type of the recording sheet 32 or the type of the screen applied by the screen processing section 226 is changed, the controller 20 moves to the process at S160. If the type of the recording sheet 32 or the type of the screen applied by the screen processing section 226 is not changed, the controller 20 moves to a process at S180. Specifically, the printer device 10 forcibly inserts the calibration job that is suitable for the printing process after the change (i.e., the following printing process), to allow the color calibration process to interrupt if the printing condition (the type of the recording sheet 32 used for the printing or the type of the screen applied by the screen processing section 226) is changed.

At the step 160 (S160), the printer device 10 permits the printing process of the test image to interrupt during the execution of the printing process requested by the user, thereby performing the color calibration process based upon the test image printed on the recording sheet 32.

At a step 180 (S90), the controller 20 determines whether an unprocessed job (normal job) is present or not. If the unprocessed job is present, the controller 20 returns to the S140 to perform the printing process for the following jobs. If the unprocessed job is not present (i.e., if there is no job waiting to be processed), the printing process (S10) is ended.

Figure 6:
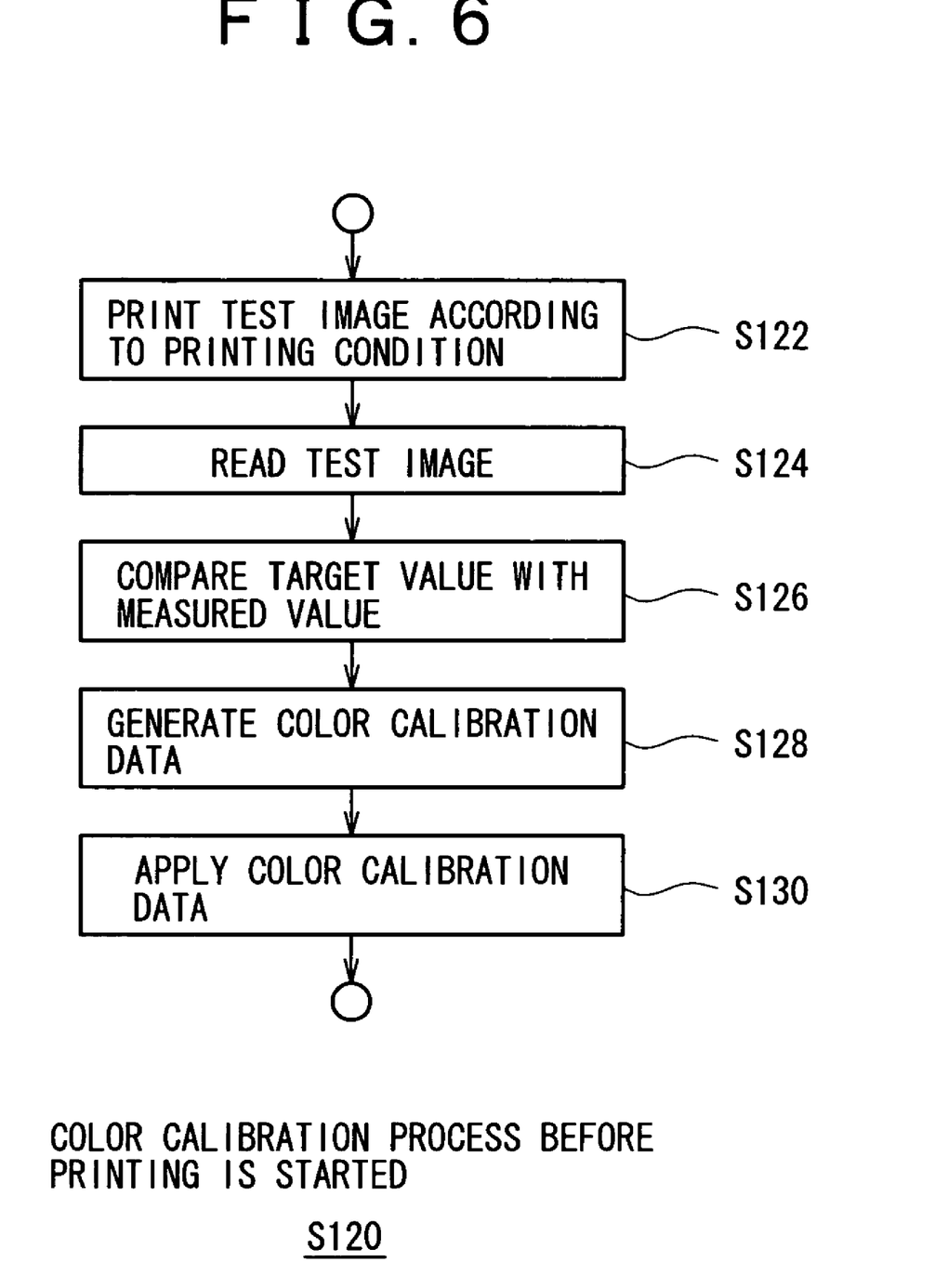
FIG. 6 is a flowchart for explaining in detail a color calibration process (S120) before printing is started.

FIG. 6 is a flowchart for explaining in detail the color calibration process (S120) before the printing is started.

As shown in FIG. 6, when the insertion of the color calibration process is decided based upon the accumulated printing number, the data obtaining section 200 selects, from among the plural calibration patterns 326 (FIG. 2) stored in the test image storing section 204, the calibration pattern 326 of the mixed color that is used in the following printing process in an amount equal to or larger than the fixed amount, and reads the image data of the selected calibration pattern 326 from the test image storing section 204 at a step 122 (S122). Further, the data obtaining section 200 sets the operation mode of the calibration job for printing the test image under the same printing conditions (the type of the recording sheet and the type of the screen) as those of the following printing process, and allows the calibration job to interrupt before the normal job.

The printer device 10 transfers the toner image of the test image composed of the calibration pattern 326 onto the recording sheet 32 according to the calibration job generated by the data obtaining section 200, thereby performing the fixing process.

At a step 124 (S124), after being subject to the fixing process by the fixing device 19, the recording sheet 32 having the test toner image transferred thereon is transported to the outside of the device through the discharge path 187.

The calorimetric sensor 189 mounted on the discharge path 187 reads the test image from the recording sheet 32 that is being transported on the discharge path 187, and outputs the read test image to the calibration value deciding section 232.

At a step 126 (S126), the calibration value deciding section 232 measures the characteristic amount of this test image based upon the test image inputted from the colorimetric sensor 189, whereupon it compares the measured characteristic amount with the preset reference value (target value) for calculating the difference value between these.

At a step 128 (S128), the calibration value deciding section 232 generates calibration data that specifies the color calibration amount according to the calculated difference value, and outputs this calibration data to the color balance adjusting section 234.

At a step 130 (S130), the color balance adjusting section 234 immediately renews the tone correction data memorized in the tone correcting section 220 based upon the calibration data inputted from the calibration value deciding section 232. Specifically, the printer device 10 applies the result of the color calibration process before the requested image is started to be printed in the color calibration process before the printing is started.

Figure 7:
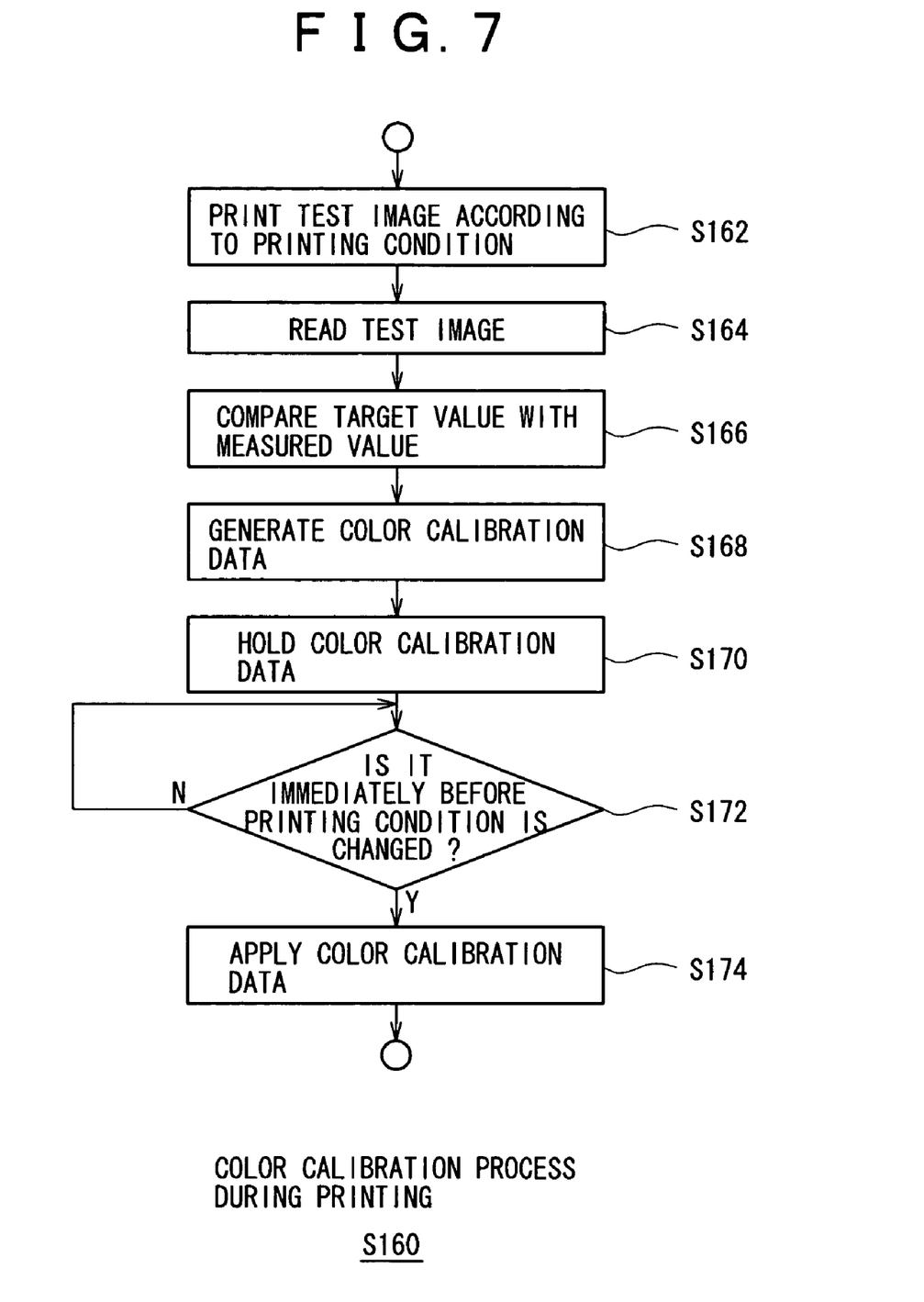
FIG. 7 is a flowchart for explaining in detail a color calibration process (S160) during the printing.

FIG. 7 is a flowchart for explaining in detail the color calibration process (S160) during the printing.

As shown in FIG. 7, when the insertion of the color calibration process is decided based upon the change in the accumulated printing number or the printing condition, the data obtaining section 200 selects, from among the plural calibration patterns 326 (FIG. 2) stored in the test image storing section 204, the calibration pattern 326 of the mixed color that is used in the following printing process in an amount equal to or larger than the fixed amount, and reads the image data of the selected calibration pattern 326 from the test image storing section 204 at a step 162 (S162). Further, the data obtaining section 200 sets the operation mode of the calibration job for printing the test image under the same printing conditions (the type of the recording sheet and the type of the screen) as those of the following printing process, and allows the calibration job to interrupt before the normal job.

The printer device 10 transfers the test toner image having the calibration pattern 326 on the recording sheet 32 according to the calibration job generated by the data obtaining section 200 and performs the fixing process.

At a step 164 (S164), after being subject to the fixing process by the fixing device 19, the recording sheet 32 having the test toner image transferred thereon is transported to the outside of the device through the discharge path 187.

The calorimetric sensor 189 mounted on the discharge path 187 reads the test image from the recording sheet 32 transported through the discharge path 187 and outputs the read test image to the calibration value deciding section 232.

At a step 166 (S166), the calibration value deciding section 232 measures the characteristic amount of this test image based upon the test image inputted from the colorimetric sensor 189, whereupon it compares the measured characteristic amount with the preset reference value (target value) for calculating the difference value between these.

At a step 168 (S168), the calibration value deciding section 232 generates calibration data that specifies the color calibration amount according to the calculated difference value, and outputs this calibration data to the color balance adjusting section 234.

At a step 170 (S170), the color balance adjusting section 234 stores the calibration data inputted from the calibration value deciding section 232 to the calibration data storing section 236. It should be noted that the printer device 10 restarts the printing process of the requested image after the printing process of the test image is completed.

At a step 172 (S172), if it is immediately before the printing conditions (the type of the recording sheet 32 or the type of the screen) are changed during the printing process of the requested image, the color balance adjusting section 234 moves to a process at S174. If it is not immediately before the printing condition is changed, it stands by.

At a step 174 (S174), the color balance adjusting section 234 renews the tone correction table memorized in the tone correcting section 220 based upon the calibration data inputted from the calibration value deciding section 232.

Specifically, the color balance adjusting section 234 reflects the result of the color calibration process on all colors at the timing immediately before the printing condition is changed. The printer device 10 reflects the result of the color calibration process at a timing when the printing condition is changed, thereby being capable of making the change in the color balance by the color calibration process unnoticeable.

As explained above, the printer device 10 in this embodiment prints the test image, during the printing process requested by the user, onto a recording sheet different from the one on which the requested image is to be printed, and performs the color calibration process based upon this test image during the printing process. This allows the printer device 10 to correct the fluctuation in the color development property generated during the successive printing process, thereby being capable of keeping the color balance of the output image almost constant.

Further, the printer device 10 in this embodiment prints only the minimum calibration pattern 326 suitable for the successive printing process on the recording sheet 32, whereby the time required for the printing process and the time required for generating the calibration data can be at a minimum, thereby being capable of preventing the productivity from being reduced.

Moreover, the printer device 10 in this embodiment reflects the result of the calibration process at a timing when the printing condition is changed, thereby being capable of making the change in the color balance before or after the color calibration process unnoticeable.

Subsequently, a first modified example of the abovementioned embodiment will be explained.

In the abovementioned embodiment, the printer device 10 prints the requested image and the test image onto different recording sheets 32, but the invention is not limited thereto. The requested image and the test image may be printed on the same recording sheet 32.

Figure 8:
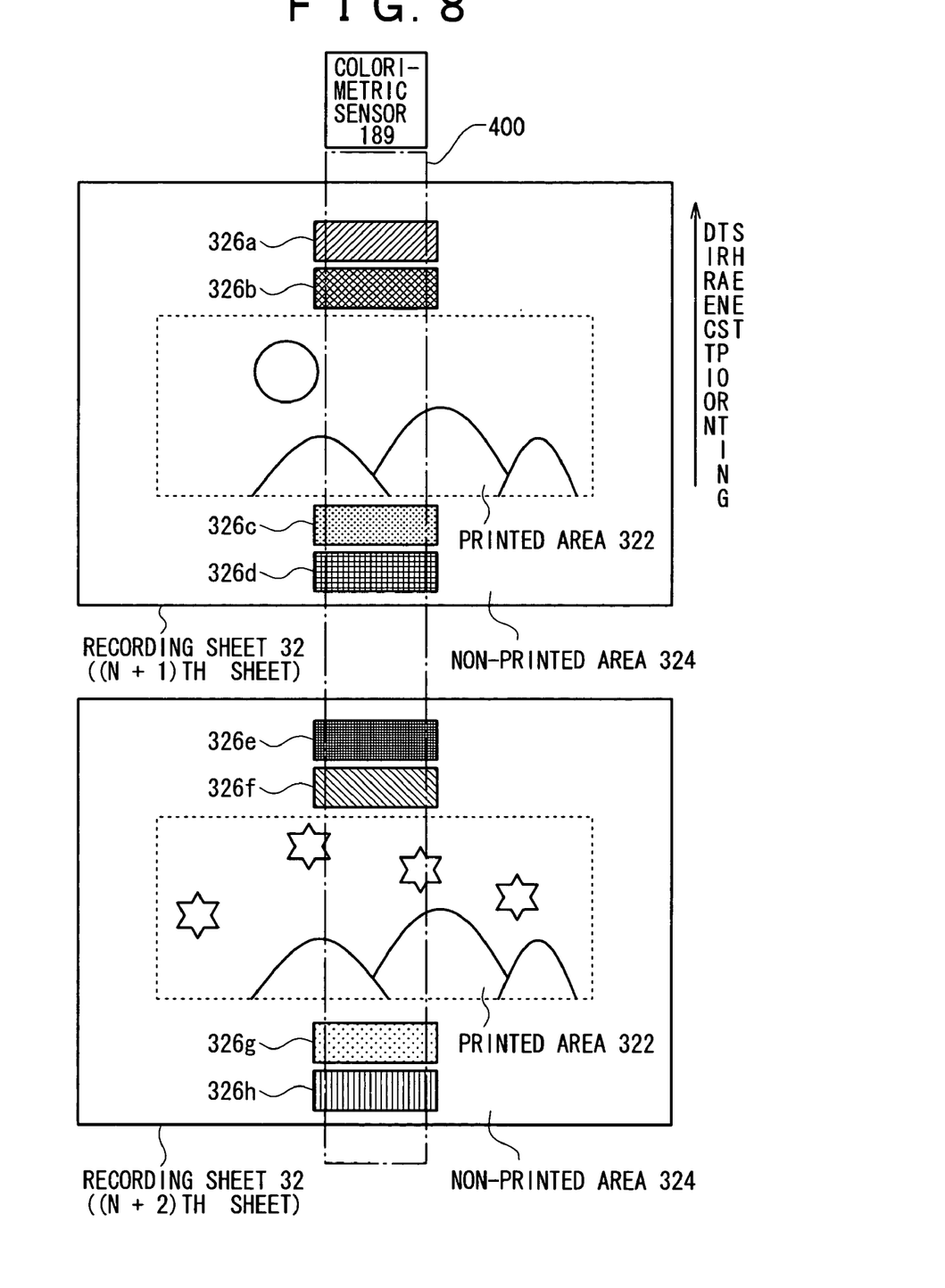
FIG. 8 is a view illustrating a requested image and a test image printed on one recording sheet 32.

FIG. 8 is a view showing a requested image and a test image printed on the same recording sheet 32.

As illustrated in FIG. 8, the printer device 10 may print the test image on a non-printed area 324 of the recording sheet 32 on which the requested image is printed. The non-printed area means here an area on the recording sheet 32 other than a printed area 322 where the requested image by a user is printed.

Specifically, the data obtaining section 200 (FIG. 4) composes the image data of the requested image and the image data of the calibration pattern 326 such that the calibration pattern 326 is arranged on the non-printed area 324 that can be read by the colorimetric sensor 189. Then, the data obtaining section 200 attaches the resultant to the calibration job to output to the color space conversion section 202. The printer device 10 prints the composite image including the requested image and the calibration pattern 326 on the same recording sheet 32 based upon the calibration job thus generated. It should be noted that, if all of the calibration patterns 326 cannot be printed due to the narrow non-printed area 324, the calibration patterns 326 may be divided among plural recording sheets 32 to be printed as illustrated in FIG. 8.

This makes it possible to simultaneously print the requested image and the test image, thereby being capable of further preventing the reduction in productivity caused by the color calibration process. It is particularly suitable when the non-printed area 324 is cut.

Moreover, the printer device 10 may select a partial image of a specific color from the requested image and decide a color calibration amount by making comparison between the characteristic amount of the selected partial image and the reference value that is a target for the color calibration process. Specifically, the calibration value deciding section 232 controls the calorimetric sensor 189 to read the partial image including a fixed mixed color (secondary color or tertiary color), calculates the difference value between the characteristic amount of this partial image and the reference value and generates calibration data based upon the calculated difference value.

A second modified example will subsequently be explained.

In the abovementioned embodiment, the guide member 400 that is almost achromatic is arranged at the position opposite to the calorimetric sensor 189 in order that the surface color of the guide member 400 does not give an influence to the reading of the test image, but the invention is not limited thereto. For example, an opening may be formed at the position opposite to the calorimetric sensor 189.

Figure 9:
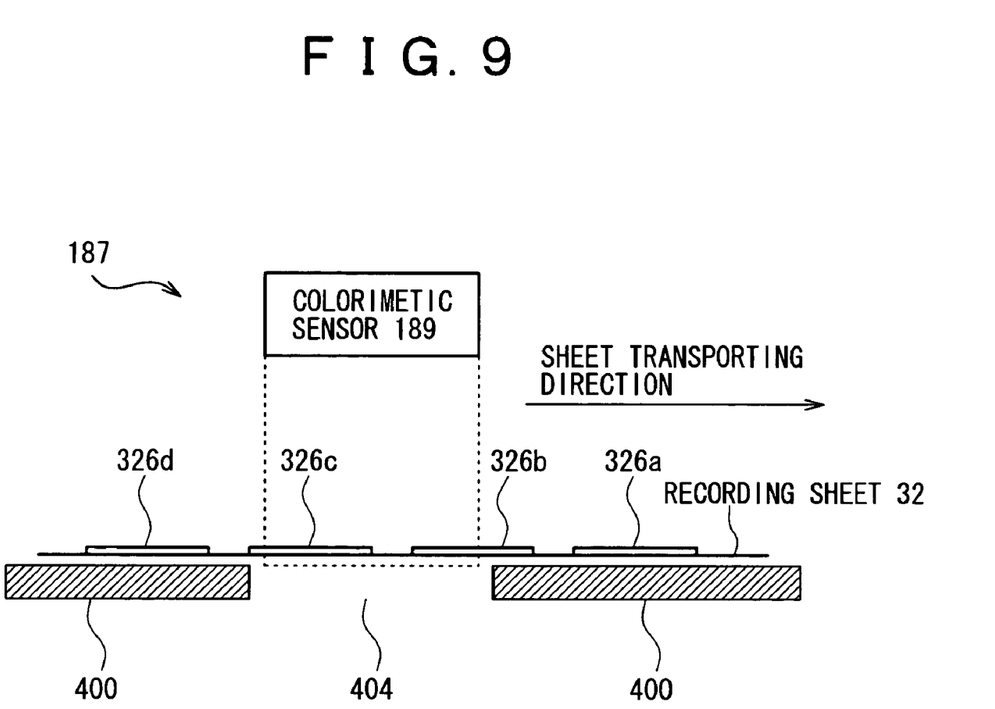
FIG. 9 is a view schematically explaining a guide member 400 provided with an opening 404.

FIG. 9 is a view schematically explaining the guide member 400 provided with an opening 404.

As shown in FIG. 9, the guide member 400 has the opening 404 at the position facing the colorimetric sensor 189. The opening 404 may be smaller than the recording sheet 32 so as to be able to guide the recording sheet 32 and greater than the area that can be read by the colorimetric sensor 189.

This allows the calorimetric sensor 189 to read the test image printed on the recording sheet 32 without the influence of the surface color of the guide member 400.

Figure 10:
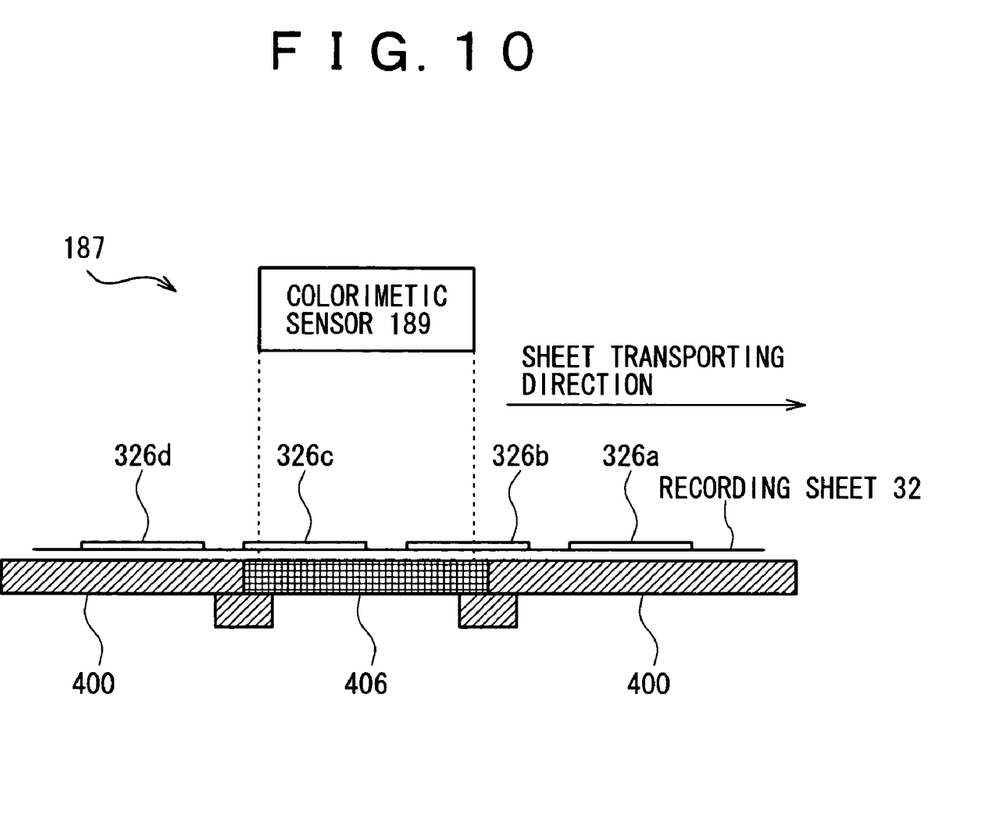
FIG. 10 is a view schematically explaining the guide member 400 having a calibration member 406 mounted to the opening 404.

Further, as illustrated in FIG. 10, the printer device 10 may be provided with a calibration member 406 that can be mounted to the opening 404 of the guide member 400 for calibrating the colorimetric sensor 189. A color or image pattern for composing the calorimetric sensor 189 is formed on the surface (at least the surface at the side of the calorimetric sensor 189) of the calibration member 406. The calorimetric sensor 189 reads the surface of the calibration member 406 facing the calorimetric sensor 189 at a timing when the recording sheet 32 does not pass, thereby performing a calibration process of a detecting precision.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-124986 filed on Apr. 21, 2004 including specification, claims, drawings and abstract is incorporated herein by reference in its entirety.

What is claimed is:

1. An image forming device comprising:
    an image forming unit that forms an image onto a recording medium, the image comprising at least one of a test image and a user-requested image;
    a controller that controls the image forming unit to form a test image including a mixed color on the recording medium;
    a transporting path that transports the recording medium on which the test image is formed by the image forming unit;
    an image detecting unit disposed on the transporting path at a position downstream of a fixing unit, the transporting path being a discharging path between the fixing unit and a discharge opening for discharging recording mediums to outside of the image forming device, the image detecting unit detecting the test image formed on the recording medium; and
    a calibration unit that performs a color calibration process based upon the test image detected by the image detecting unit, wherein
    the image forming unit includes an optical scanning device that applies light to a photoreceptor to write an electrostatic latent image and the calibration unit changes a quantity of light applied by the optical scanning device, and
    a substantially achromatic color is selected as a color included in the test image, from mixed colors set to be used for printing processes following the forming of the test image, based on the substantially achromatic color having a high frequency of occurrence.

2. The image forming device according to claim 1, wherein the controller controls the image forming unit to form the user-requested image and the test image on respective recording media different from each other.

3. The image forming device according to claim 1, wherein the controller controls the image forming unit to form the test image on an area of a recording medium other than an area where the user-requested image is formed.

4. The image forming device according to claim 1, wherein
the controller controls the image forming unit to form a test image comprising toner of at least a plurality of colors,
the fixing unit fixes the test image onto the recording medium,
the image detecting unit detects the test image fixed on the recording medium, and
the calibration unit performs the color calibration process based upon the test image detected from the recording medium.

5. The image forming device according to claim 1, wherein
the calibration unit performs the color calibration process based upon a change in a color included in the test image.

6. The image forming device according to claim 1, further comprising:
a color conversion unit that converts a color system of input image data, wherein
the image forming unit forms an image based upon the image data whose color system has been converted by the color conversion unit, and
the calibration unit changes a conversion coefficient of the color system used by the color conversion unit.

7. The image forming device according to claim 1, further comprising:
a tone correcting unit that corrects a tone of the input image data, wherein
the image forming unit forms an image based upon the image data whose tone has been corrected by the tone correcting unit, and
the calibration unit changes a tone correction coefficient used by the tone correcting unit.

8. The image forming device according to claim 1, further comprising:
a screen processor that performs a screen process on the input image data, wherein
the image forming unit forms an image based upon the image data that has been subject to the screen process by the screen processor, and
the calibration unit changes a screen coefficient used by the screen processor.

9. The image forming device according to claim 1, further comprising:
a calibration data generator that generates color calibration data based upon the test image detected by the image detecting unit; and
a calibration data memory that stores the color calibration data generated by the calibration data generator, wherein
the calibration unit performs the color calibration process by using the color calibration data stored in the calibration data memory if an image forming condition used by the image forming unit is changed.

10. The image forming device according to claim 1, further comprising:
a guide member of the transporting path, at least a portion of the guide member facing the image detecting unit having a reference color for calibrating the image detecting unit.

11. The image forming device according to claim 1, further comprising:
a guide member that constitutes a portion of the transporting path, at least a portion of the guide member facing the image detecting unit being almost achromatic.

12. The image forming device according to claim 1, further comprising:
a guide member that constitutes a portion of the transporting path, the guide member having an opening at a position at least corresponding to the image detecting unit.

13. An image forming device comprising:
an image forming unit that forms an image onto a recording medium;
an image detecting unit that detects a partial image of the image including at least a mixed color, the image detecting unit disposed along a discharging path between a fixing unit and a discharge opening for discharging recording mediums to outside of the image forming device; and
a calibration unit that performs a color calibration process based upon the partial image detected by the image detecting unit, wherein
the image forming unit includes an optical scanning device that applies light to a photoreceptor to write an electrostatic latent image and the calibration unit changes a quantity of light applied by the optical scanning device, and
a substantially achromatic color is selected as a color included in the partial image, from mixed colors set to be used for printing processes following the forming of the image, based on the substantially achromatic color having a high frequency of occurrence.

14. The image forming device according to claim 13, wherein, if a plurality of images are successively formed by the image forming unit, the image detecting unit detects at least the partial image including the mixed color among the plurality of images, and
the calibration unit performs the color calibration process based upon the partial image during a successive image forming process.

15. A calibration method comprising:
applying light to a photoreceptor;
forming a test image including a mixed color onto a recording medium;
detecting, along a discharging path between a fixing unit and a discharge opening for discharging recording mediums to outside of a image forming device, the test image formed on the recording medium after the test image has been fixed onto the recording medium; and
performing a color calibration process based upon the detected test image by changing a quantity of the light, wherein
a substantially achromatic color is selected as a color included in the test image, from mixed colors set to be used for printing processes following the forming of the test image, based on the substantially achromatic color having a high frequency of occurrence.

16. A storage medium readable by a computer, the storage medium storing a program in an image forming device including a computer,
the program causing the computer of the image forming device to execute the steps of:
applying light to a photoreceptor;
forming a test image including a mixed color onto a recording medium;
detecting, along a discharging path between a fixing unit and a discharge opening for discharging recording mediums to outside of an image forming device, the test image formed on the recording medium after the test image has been fixed on the recording medium; and performing a color calibration process based upon the detected test image by changing a quantity of the light, wherein a substantially achromatic color is selected as a color included in the test image, from mixed colors set to be used for printing processes following the forming of the test image, based on the substantially achromatic color having a high frequency of occurrence.

17. An image forming device comprising:

an image forming unit that forms an image onto a recording medium, the image comprising at least one of a test image and a user-requested image;

a controller that controls the image forming unit to form a test image including a mixed color on the recording medium;

a transporting path that transports the recording medium on which the test image is formed by the image forming unit;

an image detecting unit disposed at the transporting path that detects the test image formed on the recording medium;

a calibration unit that performs a color calibration process based upon the test image detected by the image detecting unit; and a storing unit that stores a plurality of test images, wherein a substantially achromatic color is selected as a color included in the test image, from mixed colors set to be used for printing processes following the forming of the test image, based on the substantially achromatic color having a high frequency of occurrence.

* * * * *